United States Patent
Misner

(10) Patent No.: US 6,570,668 B1
(45) Date of Patent: May 27, 2003

(54) METHOD OF MODIFYING PRINTER DRIVER OUTPUT

(75) Inventor: James I. Misner, Portland, OR (US)

(73) Assignee: Sharp Laboratories of America, Incorporated, Camas, WA (US)

(*) Notice: Subject to any disclaimer, the term of this patent is extended or adjusted under 35 U.S.C. 154(b) by 0 days.

(21) Appl. No.: 09/299,816

(22) Filed: Apr. 26, 1999

(51) Int. Cl.⁷ .............................................. G06K 15/00
(52) U.S. Cl. ..................... 358/1.15; 358/1.16
(58) Field of Search ................... 358/1.1, 1.13, 358/1.15, 1.16, 1.18, 401, 403, 404, 444, 450; 710/10, 11, 14, 16, 72, 74; 707/200, 104.1, 514–517, 522, 524

(56) References Cited

U.S. PATENT DOCUMENTS 5,559,933 A * 9/1996 Boswell ..................... 358/1.15

* cited by examiner

*Primary Examiner*—Arthur G. Evans
(74) *Attorney, Agent, or Firm*—Marger Johnson & McCollom, PC

(57) ABSTRACT

A method for altering the operation of a printer driver. A printer driver initially creates a database file. During operation of the printer driver, it accesses the database file and searches for the application that called the printer driver. If the application name is located under a heading in the database file, the printer driver modifies its operation in accordance with the heading.

6 Claims, 1 Drawing Sheet

METHOD OF MODIFYING PRINTER DRIVER OUTPUT

BACKGROUND OF THE INVENTION

1. Field of the Invention

This invention relates to printer drivers, more particularly to methods of modifying printer drivers based upon applications.

2. Background of the Invention

The increased availability of high-quality printers and software applications for printing applications has caused an explosion in desktop printing and publishing. Users have more options than every before, from printers to software applications. Print systems have become more robust in order to handle more and more printing applications.

Print systems usually include the printer and software printer drivers. The printer drivers actually control the printer in whatever manner is required by the application that calls them. With the increase in the number of applications that can call the drivers, however, little customization of the print drivers is possible for the users. Yet, some customization would be desirable.

For example, some applications only allow one page of print to be printed per print job. Others might use fonts that the printer needs for true rendering of the image. Most drivers do not handle these types of special situations, they just continue to process the print jobs as they process all print jobs. However, if the print driver could adapt to the unique requirements of applications, it would eliminate print time overhead and make the printing system more efficient.

SUMMARY OF THE INVENTION

One aspect of the invention is a method for altering a printer driver. The printer driver is created such that it will search for a database file, and if it does not locate the file, it will create one. The database file can be altered by the users of the print system that has that driver, even if it has pre-loaded information. When the printer driver is called by an application, the printer driver references the database file. If the application name is listed under any of the headings, the printer driver alters its operation in accordance with the information in the headings.

Another aspect of the invention is a printer driver with the necessary structure to search for the database file and create it if it does not locate one.

BRIEF DESCRIPTIONS OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
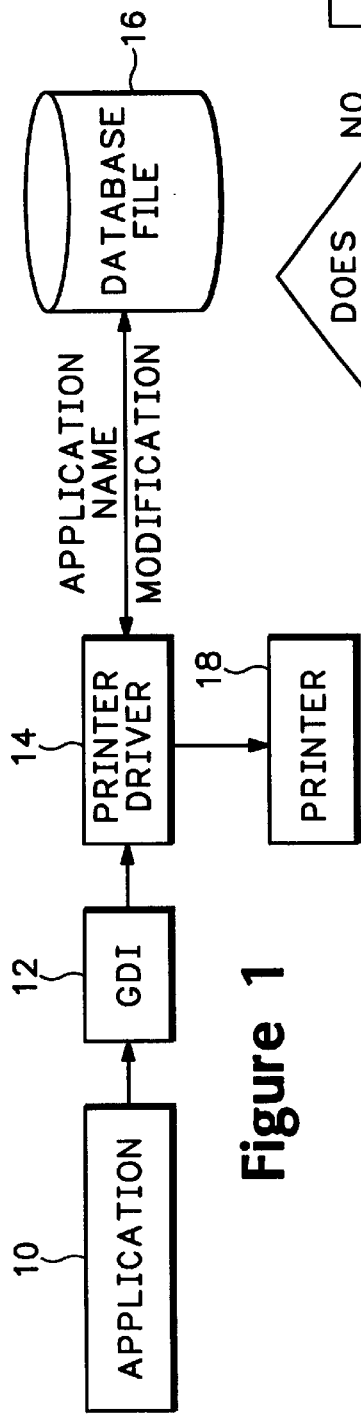
FIG. 1 shows a block diagram representation of a system used to alter operation of a printer driver in accordance with the invention.

Referring now to FIG. 1, a method of modifying a printer driver is shown in block diagram representation. As shown in block 10, the print process is started by a call from an application. The application is the program that the user is working with from which the user desires to print. Examples include programs for word processing, spreadsheets, databases, graphic image creation, etc.

The application accesses the printer driver through the graphic device interface 12. This in turn calls the printer driver 14. The printer driver has some specific characteristics to function in accordance with the invention. The printer driver first searches for a database file, the name of which is coded into the printer driver operating instructions. If the printer driver does not locate this file, it creates it.

The creation of the file could occur in many ways. One example is creation of the file from a printer driver with pre-loaded headings to alter output for already know applications. For example, when the printer driver creates the file, it could populate it with headings and applications names, the functions of which will be discussed in more detail below. Another example is creation of the file in structure, but with no pre-loaded information, leaving the population of the file to the user. The user has the capability to modify the database file regardless of whether it has information in it already.

Figure 2:
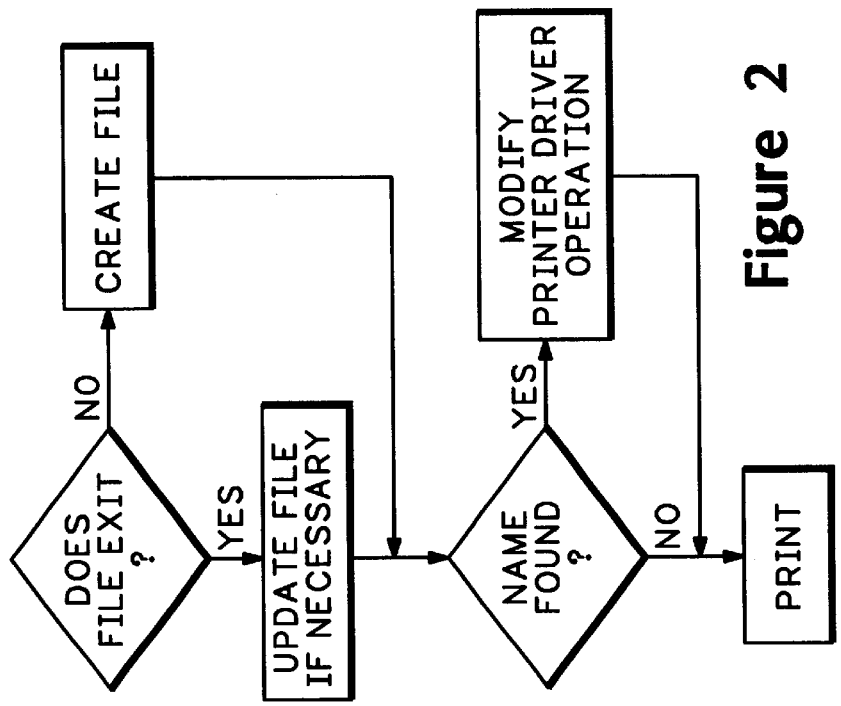
FIG. 2 shows one embodiment of a process for creating and referencing a file used to alter operation of a printer driver in accordance with the invention.

Another consideration in creation and updating of the database file is the possibility of it being created by different printer languages. For example, PostScript® could create the file. In this case, if a different printer were installed that uses a different printer language, such as Print Control Language (PCL), it would find the already-created file. In this example, the PCL driver would have to add its information to the preexisting file. Of course, if PostScript® was installed second, it would have to modify the preexisting PCL file. Some form of identification must be provided that allows the printer driver to know which printer language has created or updated the file. A flowchart of this process is shown in FIG. 2.

Once the file has been created, after initial execution of the printer driver 14, it will just reference the database file 16 to check for the current application executable name. The application name may or may not be in the database. If the application name is found in the file, the printer driver alters its operation depending upon which heading the application name is located. Once the modifications, if any, are complete the printer driver controls the operation of the printer 18 in accordance with those modifications.

For example, Adobe PhotoShop® allows each print job to contain only one page. In this case, it is a waste of processing power and time to journal the print job. In journaling a journal file is created for each page of output. This is sometimes used to print in reverse order for face-up printers, or for booklet printing, which prints pages in a specific but non-numerical order. When only one page is going to be printed, there is not need to journal, even though that may be the default operation of the driver.

Using the invention, this journaling default could be overcome. The user opens the database file, which will typically be some sort of text file. The user then enters the application's executable name, the *.exe file, into the database under the 'No journal' heading. Once the user saves and closes the file, the printer driver will be able to locate the *.exe file for PhotoShop® under that heading and avoid journaling.

Other examples of these types of alterations exist. Another example would be for Adobe Acrobat®. This program does not handle all fonts in the same way, making the download of the fonts necessary. In this case the application name would be listed under a heading to for 'Download fonts.'

An example of the format for this and other headings is shown below. As can be seen by the headings in the brackets the various alterations of the operation are listed in these headings. The application names are just listed below. More than one application could be listed under each heading, and an application name could be located under none, one or several of the headings. As can be seen under the heading [PDL], PostScript® created this particular file. Other headings can be created by the user, using just about any text editor.

| s5100p.ini |
|---|
| [PDL] |
| PS=1 |
| [NoReorder] |
| illustrator=1 |
| ai41=1 |
| photoshp=1 |
| fh7=1 |
| photopnt=1 |
| corelpnt=1 |
| photohse=1 |
| rdd=1 |
| minicad=1 |
| aclt=1 |
| psp=1 |
| xpress=1 |
| coreldrw=1 |
| wprint20=1 |
| [Epsprinting] |
| coreldrw=1 |
| ai41=1 |
| corelpnt=1 |
| [Resident] |
| acrord32=1 |
| acroex32=1 |

More than likely, the user will not be given documentation on this type of modification when he or she receives the print system. In some cases, such as high-end or application specific print systems, where the user may have more computer skills this documentation and directions may be provided. However, it seems more likely that the user will learn about the existence of the database file, and learn to modify it through technical help desks.

Other modifications and options of this invention are possible. It is possible that the printer driver could communicate with the database file in a more sophisticated manner. For example, the printer driver may find its own name under one of the headings and actually 'fix' itself based upon the heading under which its executable name is located.

Thus, although there has been described to this point a particular embodiment for a method of modifying or altering operation of printer drivers, it is not intended that such specific references be considered as limitations upon the scope of this invention except in-so-far as set forth in the following claims.

What is claimed is:

1. A method for altering operation of a printer driver, the method comprising:

determining if a database file exists for a current application;

creating a database file if no database file exists;

referencing the database file to locate a current application name;

locating headings, if any, under which said application name appears; and altering operation of said printer driver based upon any of said headings said application name appears.

2. The method as claimed in claim 1, wherein said database file is created with pre-loaded information.

3. The method as claimed in claim 1, wherein said database file is created with no pre-loaded information.

4. The method as claimed in claim 1, wherein said altering operation step further comprises not journaling a print job.

5. The method as claimed in claim 1, wherein said altering operation step further comprises downloading fonts.

6. A printer driver operable to alter its operation, comprising:

a means for searching for a database file;

a means for creating a database file if none is located; and a means for accessing said database file and altering operation if a calling application is listed under a heading, wherein said heading indicates the nature of the alteration.

* * * * *